US006737133B2

(12) United States Patent
Kusaba et al.

(10) Patent No.: US 6,737,133 B2
(45) Date of Patent: May 18, 2004

(54) ELECTROPHOTOGRAPHIC SEAMLESS BELT, AND ELECTROPHOTOGRAPHIC APPARATUS HAVING THE ELECTROPHOTOGRAPHIC SEAMLESS BELT

(75) Inventors: Takashi Kusaba, Shizuoka (JP); Akihiko Nakazawa, Shizuoka (JP); Akira Shimada, Shizuoka (JP); Atsushi Tanaka, Shizuoka (JP); Tsunenori Ashibe, Kanagawa (JP); Hidekazu Matsuda, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/953,932

(22) Filed: Sep. 18, 2001

(65) Prior Publication Data

US 2002/0061378 A1 May 23, 2002

(30) Foreign Application Priority Data

Sep. 19, 2000 (JP) ....................................... 2000-284095
Apr. 5, 2001 (JP) ....................................... 2001-107336

(51) Int. Cl.$^7$ ........................... B32B 1/08; G03G 13/01; G03G 13/14; G03G 15/01; G03G 15/20

(52) U.S. Cl. .................. 428/35.7; 428/36.9; 428/36.91; 428/36.92; 430/126; 430/47; 399/302; 399/308

(58) Field of Search .............................. 428/35.7, 36.9, 428/36.91, 36.92; 430/126, 47; 399/302, 308

(56) References Cited

U.S. PATENT DOCUMENTS

| | | | | | |
|---|---|---|---|---|---|
| 5,006,602 | A | * | 4/1991 | Guerin et al. | 525/72 |
| 5,572,304 | A | * | 11/1996 | Seto et al. | 399/313 |
| 5,802,442 | A | * | 9/1998 | Konno et al. | 399/308 |
| 5,873,018 | A | * | 2/1999 | Aoto et al. | 399/302 |
| 5,920,756 | A | * | 7/1999 | Matsuda et al. | 399/307 |
| 6,094,556 | A | | 7/2000 | Tanaka et al. | 399/302 |
| 2002/0058189 | A1 | * | 5/2002 | Tanaka et al. | 430/31 |

FOREIGN PATENT DOCUMENTS

| | | | | |
|---|---|---|---|---|
| JP | 1-309083 | | 12/1989 | |
| JP | 8-286521 | * | 11/1996 | G03G/15/16 |

* cited by examiner

*Primary Examiner*—Harold Pyon
*Assistant Examiner*—Chris Bruenjes
(74) *Attorney, Agent, or Firm*—Fitzpatrick, Cella, Harper & Scinto

(57) ABSTRACT

An electrophotographic seamless belt containing a thermoplastic fluorine resin, which contains 3 to 40 parts by weight of a polyether-ester amide or polyether amide and 0.02 to 10 parts by weight of a fluorine-atom-containing surface-active agent or halogenated alkali metal salt, based on 100 parts by weight of the thermoplastic fluorine resin. Also disclosed is an electrophotographic apparatus having the electrophotographic seamless belt.

8 Claims, 2 Drawing Sheets

ELECTROPHOTOGRAPHIC SEAMLESS BELT, AND ELECTROPHOTOGRAPHIC APPARATUS HAVING THE ELECTROPHOTOGRAPHIC SEAMLESS BELT

BACKGROUND OF THE INVENTION

1. Field of the Invention

This invention relates to an electrophotographic seamless belt such as a belt-form photosensitive member, an intermediate transfer belt, a transfer-transport (image-transferring paper-transporting) belt and a paper transport belt used in electrophotographic apparatus.

2. Related Background Art

Electrophotographic seamless belts are used for electrophotographic apparatus, and are used as, e.g., belt-form photosensitive members, intermediate transfer belts, transfer-transport belts and paper transport belts which are component parts of electrophotographic apparatus.

Electrophotographic seamless belts are commonly comprised of a binder component such as a resin, a rubber or an elastomer in which a resistance control agent has been dispersed to regulate their electrical resistance. The electrical resistance is regulated by methods grouped roughly into the following three types.

(1) A method in which a conductive filler such as carbon black is dispersed in the binder component.
(2) A method in which a surface-active agent is dispersed in the binder component.
(3) A method in which an ion-conductive polymer (polymer-type antistatic agent) is dispersed in the binder component.

The method (1) is a method of regulating electrical resistance which is prevailing in many fields at present, and has such an advantage that the electrical resistance may be hardly affected by temperature and humidity. However, it is very difficult to disperse the conductive filler uniformly in the binder component. Electrophotographic seamless belts resistance-regulated by such a method have sometimes caused faulty images such as blank areas caused by poor transfer and a leak which are due to the scattering of electrical resistance of the belt.

The method (2) can lower surface resistance, but may hardly lower volume resistivity, and have had such a problem that regulating the volume resistivity makes it necessary to add the surface-active agent in a large quantity to cause its bleeding to the surface.

The method (3) has little problems on the scattering of electrical resistance or the bleeding of additives, but can not lower electrical resistance unless the ion-conductive polymer is added in a certain large quantity. This may often cause a problem on its compatibility with the binder component. Especially when a fluorine resin is used as the binder component, the ion-conductive polymer is not well uniformly dispersed in the fluorine resin, so that the resultant belt may have insufficient surface properties and mechanical properties.

In addition, when the electrophotographic seamless belt as described above is used as an intermediate transfer belt or a transfer-transport belt, to the belt surface of which a toner may adhere in some occasions, the releasability of the toner from the belt is still so insufficient as to sometimes cause what is called filming, a phenomenon in which the toner sticks to the belt surface.

In general, polymer-type antistatic agents (ion-conductive polymers) such as polyether-ester amide and polyether amide are considered to form streaky continuous phases in a binder resin and exhibit ionic conduction (semiconduction), and it is known that dispersion of a polymer-type antistatic agent in excess causes a lowering of ionic conduction.

However, when an electrophotographic seamless belt is produced using a resin composition in which the polymer-type antistatic agent is dispersed in streaks, the resultant electrophotographic seamless belt may have so poor surface properties that coarse images tend to be formed when the belt is set in an electrophotographic apparatus and images are reproduced. Also, when the electrophotographic seamless belt is formed by extrusion, there has been such a problem that the polymer-type antistatic agent may orient in streaks in the direction of extrusion (the axial direction of the belt extruded in a tubular form) and the belt tends to split at its ends. Such splitting at the belt ends may remarkably occur when a fluorine resin is used as the binder component of the electrophotographic seamless belt.

Japanese Patent Publication No. 08-007505 discloses a seamless belt formed of a thermoplastic fluorine resin incorporated therein with polyether-ester amide or polyether amide and a sulfonic acid metal salt, but has no disclosure as to surface properties (dispersibility of polymer-type antistatic agent and releasability of toner) and mechanical properties (anti-splitting) of the belt. Nothing is taken into consideration at all on these.

SUMMARY OF THE INVENTION

An object of the present invention is to provide an electrophotographic seamless belt having very uniform electrical resistance and superior surface properties and mechanical properties.

The present inventors have made extensive studies taking note of the fact that an ionic-conduction system making use of an ion-conductive polymer (polymer-type antistatic agent such as polyether-ester amide, polyether amide, epichlorohydrin and polyalkylene glycol) is more advantageous than an electronic-conduction system in which the electrical resistance is regulated by dispersing a conductive filler such as carbon black, and that a thermoplastic fluorine resin is used as the binder component of the electrophotographic seamless belt taking account of the releasability of toner.

The present inventors have also made extensive studies on any formulation that enables the polymer-type antistatic agent polyether-ester amide or polyether amide to uniformly disperse in the thermoplastic fluorine resin and at the same time does not lower the ionic conduction (semiconduction). As a result, they have discovered that a seamless belt having very uniform electrical resistance and also having satisfied the surface properties and the mechanical properties can be obtained by mixing in a fluorine resin the polyether-ester amide or polyether amide and a fluorine-atom-containing surface-active agent or halogenated alkali metal salt.

More specifically, the present invention provides an electrophotographic seamless belt containing a thermoplastic fluorine resin, which comprises 3 to 40 parts by weight of a polyether-ester amide or polyether amide and 0.02 to 10 parts by weight of a fluorine-atom-containing surface-active agent or halogenated alkali metal salt, based on 100 parts by weight of the thermoplastic fluorine resin.

The present invention also provides an electrophotographic apparatus comprising the above electrophotographic seamless belt.

DESCRIPTION OF THE PREFERRED EMBODIMENTS

Figure 1:
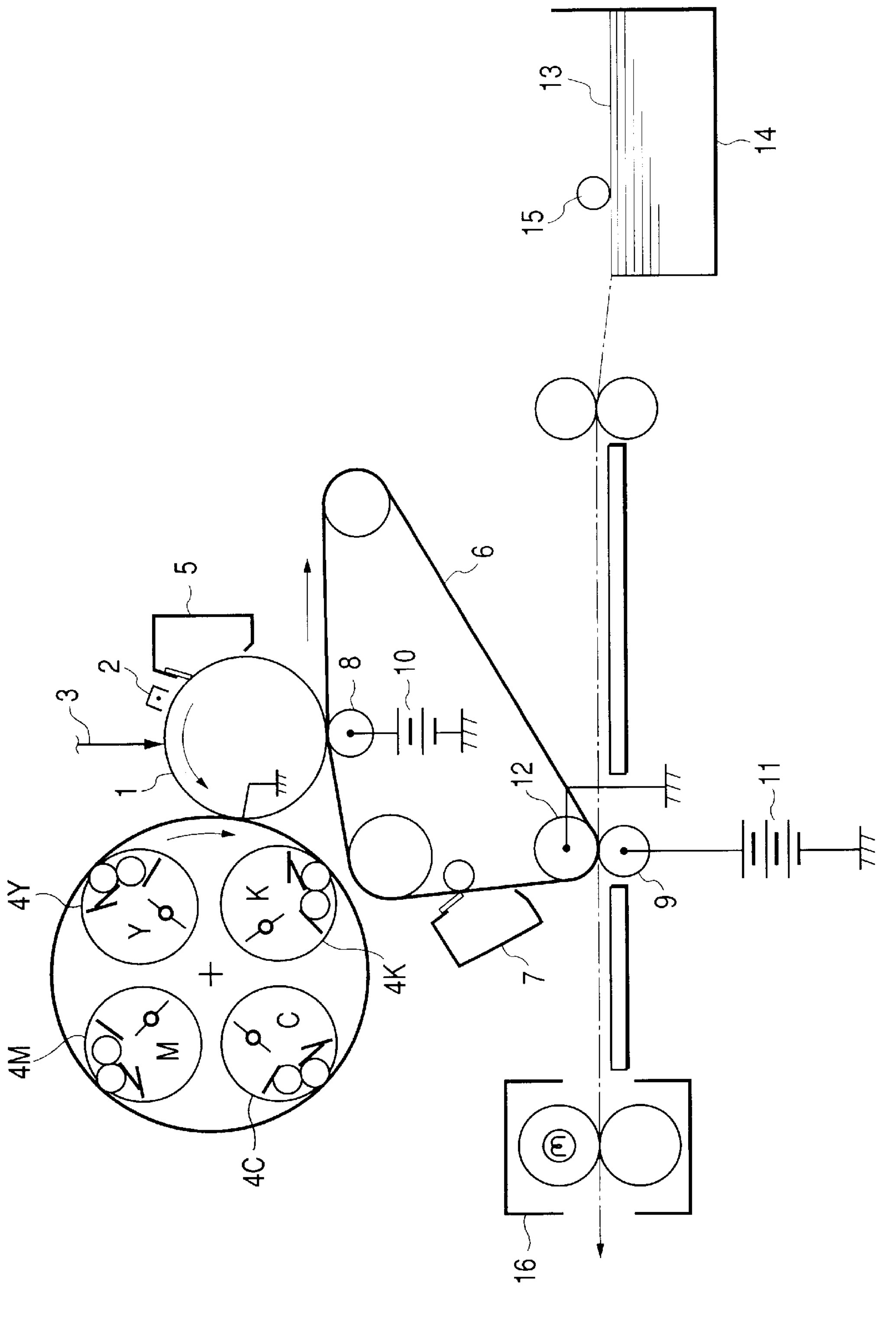
FIG. 1 is a schematic cross-sectional view showing an example of the construction of a color electrophotographic apparatus utilizing an electrophotographic process, used in the present invention.

In the present invention, a polyether-ester amide or polyether amide and a fluorine-atom-containing surface-active agent or halogenated alkali metal are mixed in a thermoplastic fluorine resin. The mixing of the fluorine-atom-containing surface-active agent or halogenated alkali metal brings about an improvement in dispersibility of the polyether-ester amide or polyether amide in the thermoplastic fluorine resin. The reason is presumably that the fluorine-atom-containing surface-active agent or halogenated alkali metal salt acts as a dispersant of the polyether-ester amide or polyether amide. This is an effect which was not obtainable in the belt disclosed in Japanese Patent Publication No. 08-007505, which makes use of a dodecylbenzenesulfonate. Also, even though the polyether-ester amide or polyether amide is uniformly dispersed here in the thermoplastic fluorine resin, a stable resistance controllability is exhibited. As the reason therefor, it is considered that the fluorine-atom-containing surface-active agent or halogenated alkali metal salt exhibits good ionic conduction in the polyether-ester amide or polyether amide unit.

As another conventional technique, Japanese Patent Application Laid-open No. 08-286521 discloses an intermediate transfer member containing a fluorine-atom-containing surface-active agent. However, it only discloses that the fluorine-atom-containing surface-active agent is effective for preventing warm-shaped blank images, and is quite different from the present invention in which the combination with the polyether-ester amide or polyether amide has brought out the unique properties as in the present invention.

In the present invention, the polyether-ester amide or polyether amide is contained in an amount of from 3 to 40 parts by weight based on 100 parts by weight of the thermoplastic fluorine resin. If it is less than 3 parts by weight, the resistance may less effectively be regulated. If it is more than 40 parts by weight, it may have a poor compatibility with the thermoplastic fluorine resin, so that the product tends to break or split when used as the belt.

The fluorine-atom-containing surface-active agent or halogenated alkali metal salt is contained in an amount of from 0.02 to 10 parts by weight based on 100 parts by weight of the thermoplastic fluorine resin. If it is less than 0.02 part by weight, no improvement may be seen in the dispersibility of the polyether-ester amide or polyether amide in the thermoplastic fluorine resin. If it is more than 10 parts by weight, the resultant belt may have low surface properties and at the same time may have a low dielectric strength (breakdown strength required when a voltage is applied).

In the present invention, as the fluorine-atom-containing surface-active agent, any of nonionic, cationic, anionic and cationic/anionic amphoteric surface-active agents may be used. It may include alkali metal salts of perfluoroalkylsulfonic acids, such as potassium perfluorobutanesulfonate, lithium perfluorobutanesulfonate, potassium perfluorooctanesulfonate and lithium perfluorooctanesulfonate; and alkali metal salts of perfluoroalkylcarboxylic acids, such as potassium perfluorobutanecarboxylate, lithium perfluorobutanecarboxylate, potassium perfluorooctanecarboxylate and lithium perfluorooctanecarboxylate. Alkali metal salts of perfluoroalkylsulfonic acids are preferred because the dispersibility of the polyether-ester amide or polyether amide in the thermoplastic fluorine resin can greatly be improved. Here, any of the alkali metal salts of perfluoroalkylsulfonic acids may particularly preferably be added in an amount of from 3 parts by weight to 10 parts by weight because the belt can greatly effectively be prevented from filming. The halogenated alkali metal salt may include sodium fluoride, potassium chloride and lithium chloride.

The electrophotographic seamless belt may preferably have a modulus in tension of from 500 MPa to 4,000 MPa. If the belt has a modulus in tension lower than 500 MPa, problems due to expansion and contraction of the belt (e.g., color aberration in color electrophotographic apparatus) tend to occur. If the belt has a modulus in tension higher than 4,000 MPa, it may have an inferior durability because of a poor flexibility. The modulus in tension is measured according to JIS K-7127.

As the thermoplastic fluorine resin, polyvinylidene fluoride resins are preferred because of their extrusion temperature close to that of the polyether-ester amide or polyether amide and their superior mechanical properties. Here, the polyvinylidene fluoride resins may include polyvinylidene fluoride, and besides, vinylidene fluoride copolymers having vinylidene fluoride as a chief constituent unit, such as a vinylidene fluoride-hexafluoropropylene copolymer, a vinylidene fluoride-tetrafluoroethylene copolymer and a vinylidene fluoride-hexafluoropropylene-tetrafluoroethylene copolymer, a vinylidene fluoride, any of which may be used alone or in combination.

In the present invention, plastic additives (such as an antioxidant, a lubricant and a filler) commonly used may also be added as long as belt properties are not affected.

The electrophotographic seamless belt may also preferably have an electrical resistance value of from $1\times10^{4}$ Ω to $1\times10^{14}$ Ω. It may also be electrical resistance having a scattering in which the maximum value of the electrical resistance is less than 10 times the minimum value of the electrical resistance. Such electrical resistance is preferable because images can have a superior uniformity when the electrophotographic seamless belt is set in an electrophotographic apparatus and images are reproduced.

As methods for producing the electrophotographic seamless belt, extrusion is preferred because the electrophotographic seamless belt can be produced continuously, realizing a lower cost for the belt.

In the present invention, as methods for dispersing in the thermoplastic fluorine resin the polyether-ester amide or polyether amide and the fluorine-atom-containing surface-active agent or halogenated alkali metal salt, known kneading and dispersion methods may be used. Dispersion carried out using a twin-screw extruder is preferred because it has high dispersion power and productivity.

An example of an image forming apparatus employing an intermediate transfer belt which is an electrophotographic seamless belt is schematically shown in FIG. 1.

The apparatus shown in FIG. 1 is a full-color image-forming apparatus (copying machine or laser beam printer) utilizing an electrophotographic process. A medium-resistance elastic material is used in an intermediate transfer belt 6.

Reference numeral 1 denotes a drum-shaped electrophotographic photosensitive member repeatedly used as a first image bearing member, which is rotatively driven at a prescribed peripheral speed (process speed) in the direction of an arrow.

The photosensitive drum 1 is, in the course of its rotation, uniformly charged to prescribed polarity and potential by means of a primary charging assembly 2, and then imagewise exposed to light by an exposure means 3 (e.g., a color-original image color-resolving/image-forming optical system, or a scanning exposure system comprising a laser scanner that outputs laser beams modulated in accordance with time-sequential electrical digital pixel signals of image information). Thus, on the surface of the electrophotographic photosensitive member, an electrostatic latent image is formed which corresponds to a first color component image (e.g., a yellow color component image) of the intended color image.

Next, the electrostatic latent image formed is developed with a first-color yellow toner Y by means of a first developing assembly (yellow color developing assembly 4Y). At this stage, second to fourth developing assemblies (magenta color developing assembly 4M, cyan color developing assembly 4C and black color developing assembly 4K) each stand unoperated and do not act on the electrophotographic photosensitive member 1, and hence the first-color yellow toner image is not affected by the second to fourth developing assemblies.

The intermediate transfer belt 6 is clockwise rotatively driven at the same peripheral speed as the electrophotographic photosensitive member 1.

The first-color yellow toner image formed and held on the electrophotographic photosensitive member 1 passes a nip formed between the electrophotographic photosensitive member 1 and the intermediate transfer belt 6, in the course of which it is successively intermediately transferred to the periphery of the intermediate transfer belt 6 (primary transfer) by the aid of an electric field formed by a primary transfer bias applied to the intermediate transfer belt 6 through a primary transfer roller 8.

The electrophotographic photosensitive member 1 surface from which the first-color yellow toner image has been transferred, corresponding to the intermediate transfer belt 6, is cleaned by a photosensitive member cleaner 5.

Subsequently, the second-color magenta toner image, the third-color cyan toner image and the fourth-color black toner image are sequentially similarly transferred and superimposed onto the intermediate transfer belt 6. Thus, synthesized color toner images corresponding to the intended full-color image are formed.

Reference numeral 9 denotes a secondary transfer roller, which is provided in such a way that it is axially supported in parallel with a secondary transfer opposing roller 12 and stands separable from the bottom surface of the intermediate transfer belt 6.

The primary transfer bias for sequentially superimposing and transferring the first- to fourth-color toner images from the electrophotographic photosensitive member 1 onto the intermediate transfer belt 6 is applied from a bias source 10 in a polarity (+) reverse to that of each toner. The voltage thus applied is, e.g., in the range of from +100 V to +2 kV.

In the step of primary transfer of the first- to third-color toner images from the electrophotographic photosensitive member 1 to the intermediate transfer belt 6, the secondary transfer roller 9 may also be set separable from the intermediate transfer belt 6.

The synthesized color toner images transferred to the intermediate transfer belt 6 are transferred to a second image bearing member, transfer medium 13, in the following way: The secondary transfer roller 9 is brought into contact with the intermediate transfer belt 6 and simultaneously the transfer medium 13 is fed at a prescribed timing from a paper feed roller 15 through a transfer medium guide until it reaches a contact nip formed between the intermediate transfer belt 6 and the secondary transfer roller 9, where a secondary transfer bias is applied to the secondary transfer roller 9 from a power source 11. On account of this secondary transfer bias, the synthesized color toner images are transferred from the intermediate transfer belt 6 to the second image bearing member transfer medium 13 (secondary transfer). The transfer medium 13 to which the toner images have been transferred are guided into a fixing assembly 16 and are heat-fixed.

After the toner images have been transferred to the transfer medium 13, an intermediate transfer belt cleaner 7 is brought into contact with the intermediate transfer belt 6, and a bias with a polarity reverse to that of the electrophotographic photosensitive member 1 is applied, whereupon electric charges with a polarity reverse to that of the electrophotographic photosensitive member 1 are imparted to toners not transferred to the transfer medium 13 and remaining on the intermediate transfer belt 6 (i.e., transfer residual toners).

The transfer residual toners are electrostatically transferred to the electrophotographic photosensitive member 1 at the nip between the electrophotographic photosensitive member 1 and the intermediate transfer belt 6 and the vicinity thereof, thus the intermediate transfer belt 6 is cleaned.

A method of measuring the electrical resistance of the electrophotographic seamless belt in the present invention is also described below with reference to FIG. 2.

Figure 2:
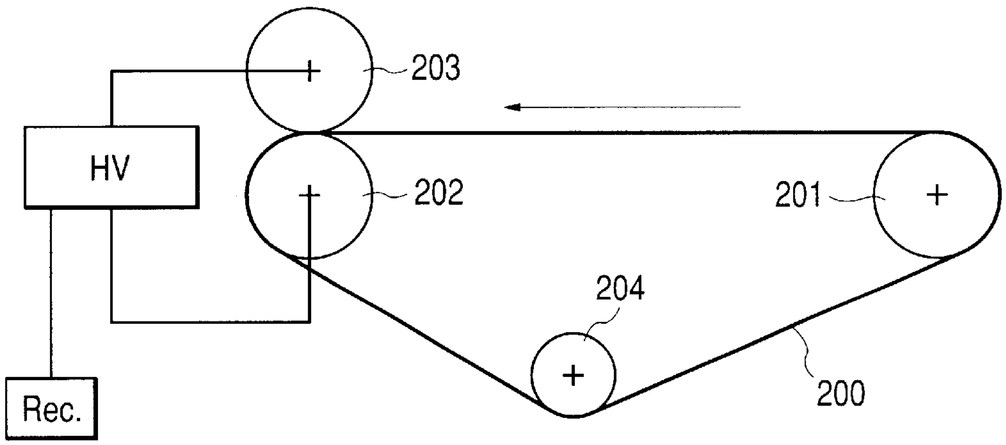
FIG. 2 is a schematic cross-sectional view of a resistance-measuring instrument used in the present invention.

As a resistance-measuring instrument, a device as shown in FIG. 2 is used. An electrophotographic seamless belt 200 is put over a drive roller 201 (made of rubber with a JIS-A hardness of 60°; diameter: 30 mm), an electrode roller 202 (made of aluminum; diameter: 30 mm) and a tension roller 204 (made of aluminum; diameter: 20 mm; tension load: 50 N). A power supply roller 203 is also kept in contact with the electrode roller 202 at a force of 20 N. The power supply roller 203 is a rubber roll having a sufficiently low resistance to the belt whose resistance is to be measured, and has a JIS-A hardness of 60° and a diameter of 30 mm.

The electrophotographic seamless belt 200 is driven by the drive roller 201 in the direction of an arrow at a speed of 100 mm/s. A voltage of +100 V is applied from a high-voltage power source HV (Model 610C, manufactured by TReK Co.) to the powder supply roller 203. Electric current flowing across the powder supply roller 203 and the electrode roller 202 and signals outputted from a current output monitor of the high-voltage power source HV are recorded in a recorder Rec. (an oscillographic recorder ORM1200, manufactured by Yokogawa Denki K. K.), and calculation is made from the electric current and applied voltage 100 V to determine the electrical resistance of the electrophotographic seamless belt. Here, the sample rate of the recorder Rec. is set at 100 Hz, and electrical resistance corresponding to one round of the belt is measured. An average value of data of the electrical resistance corresponding to one round is regarded as the value of electrical resistance of the electrophotographic seamless belt.

The maximum value (Rmax) of electrical resistance in one round of the belt is divided by the minimum value (Rmin) of electrical resistance, and the value of Rmax/Rmin obtained is regarded as scattering of electrical resistance values of the electrophotographic seamless belt.

The present invention is described below in greater detail by giving Examples.

EXAMPLE 1

A formulation (or compound) of the polyether-ester amide or polyether amide and the fluorine-atom-containing surface-active agent or halogenated alkali metal salt (hereinafter simply "formulation") was prepared using:

| | (by weight) |
|---|---|
| Polyvinylidene fluoride resin (trade name: KF Polymer #850; available from Kureha Chemical Industry Co. Ltd.) | 100 parts |
| Polyether-ester amide (trade name: PELESTAT 6321; available from Sanyo Chemical Industries, Ltd.) | 20 parts |
| Fluorine-atom-containing surface-active agent (potassium perfluorooctanesulfonate; trade name: MEGAFAX F-110; available from Dainippon Ink & Chemicals, Incorporated) | 4 parts |

The above formulation was melt-kneaded at 210° C. by means of a twin-screw extruder to obtain a antistatic resin composition. The antistatic resin composition thus obtained was extruded to produce an electrophotographic seamless belt of 140 mm in diameter and 250 mm in width. On the belt obtained, the following electrical-property test, image reproduction test and mechanical-property test were conducted to make evaluation. The results of evaluation are shown in Table 1.

Electrical-property Test

Measurement of electrical resistance and scattering of electrical resistance:

The belt was set in the resistance-measuring device shown in FIG. 2, and the electrical resistance of the electrophotographic seamless belt and the scattering of electrical resistance were measured.

Evaluation of dielectric strength:

The belt was set in the resistance-measuring device shown in FIG. 2, and a voltage of +2.0 kV was applied from the high-voltage powder source HV. A belt having caused breakdown was evaluated as "C"; and a belt having caused no breakdown, as "A".

Image Reproduction Test

Initial image evalution:

The electrophotographic seamless belt produced as described above was set as the intermediate transfer belt of the electrophotographic apparatus shown in FIG. 1, and full-color images were reproduced. A case in which uniform images were obtained was evaluated as "A"; a case in which images formed were a little non-uniform, but on a level not problematic in practical use, as "A-"; and a case in which images formed were apparently non-uniform, as "B".

Mechanical-property Test

Modulus in tension:

A No. 3 dumbbell prescribed in JIS K-7127 was produced so as to stretch the electrophotographic seamless belt in its peripheral direction (belt travel direction), and stretching is performed at a test speed of 5 mm/min. Its modulus in tension was determined on the basis of tensile stress and distortion within an elongation of from 0 to 1%.

Figure 3:
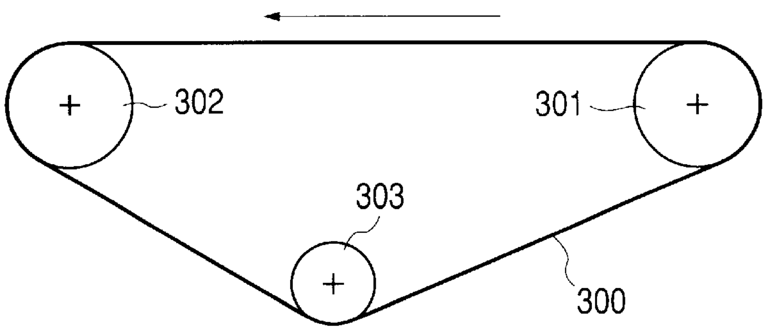
FIG. 3 is a schematic cross-sectional view of a belt idle running tester used in the present invention.

Tear resistance evaluation:

The electrophotographic seamless belt produced as described above was notched with a utility knife at its one end in a length of 5 mm from the end in the axial direction of the belt, and was set in a belt idle running tester shown in FIG. 3. A case in which the notch was in a length smaller than 10 mm after the belt was rotated 10,000 times was evaluated as "A"; a case in which it was in a length of from 10 mm to less than 15 mm, as "A-"; and a case in which it extended to 15 mm or more, as "B". The case "A-" was judged to be tolerable in practical use.

In FIG. 3, the electrophotographic seamless belt 300 is put over a drive roller 301 (made of rubber with a JIS-A hardness of 60°; diameter: 30 mm), a follower roller 302 (made of aluminum; diameter: 30 mm) and a tension roller 303 (made of aluminum; diameter: 30 mm; tension load: 50 N). The electrophotographic seamless belt is driven by the drive roller 301 at a speed of 100 mm/s in the direction of an arrow.

EXAMPLE 2

An electrophotographic seamless belt was produced in the same manner as in Example 1 except that the formulation prepared therein was changed as shown below. The evaluation tests on various properties were also made in the same way. The results of evaluation are shown in Table 1.

| | (by weight) |
|---|---|
| Polyvinylidene fluoride resin (trade name: KF Polymer #850; available from Kureha Chemical Industry Co. Ltd.) | 100 parts |
| Polyether-ester amide (trade name: PELESTAT 6321; available from Sanyo Chemical Industries, Ltd.) | 6 parts |
| Sodium fluoride | 0.5 part |

EXAMPLE 3

An electrophotographic seamless belt was produced in the same manner as in Example 1 except that the formulation prepared therein was changed as shown below. The evaluation tests on various properties were also made in the same way. The results of evaluation are shown in Table 1.

| | (by weight) |
|---|---|
| Polyvinylidene fluoride resin (trade name: KF Polymer #850; available from Kureha Chemical Industry Co. Ltd.) | 100 parts |
| Polyether-ester amide (trade name: PELESTAT 6321; available from Sanyo Chemical Industries, Ltd.) | 20 parts |
| Fluorine-atom-containing surface-active agent (trade name: KFBS; available from Tohchem Products Co.) | 4 parts |

EXAMPLE 4

An electrophotographic seamless belt was produced in the same manner as in Example 1 except that the formulation prepared therein was changed as shown below. The evaluation tests on various properties were also made in the same way. The results of evaluation are shown in Table 1.

| | (by weight) |
|---|---|
| Polyvinylidene fluoride resin (trade name: KF Polymer #850; available from Kureha Chemical Industry Co. Ltd.) | 100 parts |
| Polyether-ester amide (trade name: PELESTAT 3170; available from Sanyo Chemical Industries, Ltd.) | 40 parts |
| Sodium fluoride | 0.1 part |

Comparative Example 1

A formulation was prepared using:

| | (by weight) |
|---|---|
| Polycarbonate resin (trade name: PANLITE K-1300CM; available from Teijin Chemicals Ltd.) | 100 parts |
| Conductive carbon black (trade name: DENKA BLACK; available from Asahi Denka Kogyo K.K.) | 14 parts |
| Fluorine-atom-containing surface-active agent (trade name: MEGAFAX F-110; available from Dainippon Ink & Chemicals, Incorporated) | 2 parts |

The above formulation was melt-kneaded at 280° C. by means of a twin-screw extruder to obtain an antistatic resin composition. The antistatic resin composition thus obtained was extruded to produce an electrophotographic seamless belt of 140 mm in diameter and 250 mm in width. Using the belt obtained, evaluation tests on various properties were also made in the same manner as in Example 1. The results of evaluation are shown in Table 1.

Comparative Example 2

An electrophotographic seamless belt was produced in the same manner as in Example 1 except that the formulation prepared therein was changed as shown below. The evaluation tests on various properties were also made in the same way. The results of evaluation are shown in Table 1.

| | (by weight) |
|---|---|
| Polyvinylidene fluoride resin (trade name: KF Polymer #850; available from Kureha Chemical Industry Co. Ltd.) | 100 parts |
| Polyether-ester amide (trade name: PELESTAT 6321; available from Sanyo Chemical Industries, Ltd.) | 30 parts |

-continued

| | (by weight) |
|---|---|
| Sodium dodecylbenzenesulfonate | 2 parts |

Comparative Example 3

An electrophotographic seamless belt was produced in the same manner as in Example 1 except that the formulation prepared therein was changed as shown below. The evaluation tests on various properties were also made in the same way. The results of evaluation are shown in Table 1.

| | (by weight) |
|---|---|
| Polyvinylidene fluoride resin (trade name: KF Polymer #850; available from Kureha Chemical Industry Co. Ltd.) | 100 parts |
| Polyether-ester amide (trade name: PELESTAT 6321; available from Sanyo Chemical Industries, Ltd.) | 20 parts |
| Fluorine-atom-containing surface-active agent (trade name: MEGAFAX F-110; available from Dainippon Ink & Chemicals, Incorporated) | 11 parts |

Comparative Example 4

An electrophotographic seamless belt was produced in the same manner as in Example 1 except that the formulation prepared therein was changed as shown below. The evaluation tests on various properties were also made in the same way. The results of evaluation are shown in Table 1.

| | (by weight) |
|---|---|
| Polyvinylidene fluoride resin (trade name: KF Polymer #850; available from Kureha Chemical Industry Co. Ltd.) | 100 parts |
| Polyether-ester amide (trade name: PELESTAT 2450; available from Sanyo Chemical Industries, Ltd.) | 20 parts |
| Fluorine-atom-containing surface-active agent (trade name: MEGAFAX F-110; available from Dainippon Ink & Chemicals, Incorporated) | 3 parts |

TABLE 1

| | Electrical properties | | | Image characteristics | | Mechanical properties | |
|---|---|---|---|---|---|---|---|
| | Electrical resistance (Ω) | Electrical resistance scattering | Dielectric strength | Initial image | Anti-filming | Modulus in tension | Tear resistance |
| Example: | | | | | | | |
| 1 | $3.50 \times 10^7$ | 2.3 | A | A | A | 720 | A |
| 2 | $5.30 \times 10^7$ | 3.5 | A | A | A | 950 | A |
| 3 | $8.70 \times 10^6$ | 2.8 | A | A– | A | 700 | A |
| 4 | $5.60 \times 10^6$ | 1.8 | A | A | A | 430 | A– |

TABLE 1-continued

| | Electrical properties | | | | | | |
|---|---|---|---|---|---|---|---|
| | Electrical resistance (Ω) | Electrical resistance scattering | Dielectric strength | Image characteristics: Initial image | Image characteristics: Anti-filming | Mechanical properties: Modulus in tension | Mechanical properties: Tear resistance |
| Comparative Example: | | | | | | | |
| 1 | $7.20 \times 10^6$ | 170 | B | B | B | 2,300 | A |
| 2 | $4.70 \times 10^7$ | 3.8 | A | A | A | 540 | B |
| 3 | $3.80 \times 10^6$ | 7.8 | B | A− | A | 620 | A |
| 4 | $1.60 \times 10^6$ | 5.5 | A | A | A | 350 | B |

As described above, according to the present invention, an electrophotographic seamless belt having very uniform electrical resistance and superior surface properties and mechanical properties can be obtained.

What is claimed is:

1. An electrophotographic seamless belt consisting of:

(a) a thermoplastic fluorine resin;

(b) 3 to 40 parts by weight of a polyether-ester amide or a polyether amide, based on 100 parts by weight of the thermoplastic fluorine resin; and (c) 0.02 to 10 parts by weight of an alkali metal salt of perfluoroalkylsulfonic acid or sodium fluoride, based on 100 parts by weight of the thermoplastic fluorine resin, where the amount of the alkali metal salt of perfluoroalkylsulfonic acid or sodium fluoride is 0.25 to 40 parts by weight based on 100 parts by weight of the polyether-ester amide or polyether amide, and wherein said belt has an electrical resistance value from $1\times10^4$ Ω to $1\times10^{14}$ Ω and a scattering of said electrical resistance value in which the maximum value ($R_{max}$) of the electrical resistance is less than 10 times the minimum value ($R_{min}$) of the electrical resistance.

2. The electrophotographic seamless belt according to claim 1, wherein said thermoplastic fluorine resin is polyvinylidene fluoride resin.

3. The electrophotographic seamless belt according to claim 1, including the alkali metal salt of perfluoroalkylsulfonic acid.

4. The electrophotographic seamless belt according to claim 1, which has a modulus in tension from 500 MPa to 4,000 MPa.

5. The electrophotographic seamless belt according to claim 1, which is a belt formed by extrusion.

6. The electrophotographic seamless belt according to claim 1, which is an intermediate transfer belt.

7. An electrophotographic apparatus having an electrophotographic seamless belt, wherein said electrophotographic seamless belt consists of:

(a) a thermoplastic fluorine resin;

(b) 3 to 40 parts by weight of (i) a polyether-ester amide or (ii) a polyether amide, based on 100 parts by weight of the thermoplastic fluorine resin; and (c) 0.02 to 10 parts by weight of an alkali metal salt of perfluoroalkylsulfonic acid or sodium fluoride based on 100 parts by weight of the thermoplastic fluorine resin, where the amount of the alkali metal salt of perfluoroalkylsulfonic acid or sodium fluoride is 0.25 to 40 parts by weight based on 100 parts by weight of the polyether-ester amide or polyether amide, and wherein said belt has an electrical resistance value from $1\times10^4$ Ω to $1\times10^{14}$ Ω and a scattering of said electrical resistance value in which the maximum value ($R_{max}$) of the electrical resistance is less than 10 times the minimum value ($R_{min}$) of the electrical resistance.

8. The electrophotographic apparatus according to claim 7, wherein said electrophotographic seamless belt is an intermediate transfer belt.

* * * * *